United States Patent [19]

Yasui

[11] Patent Number: 4,933,783
[45] Date of Patent: Jun. 12, 1990

[54] AGC CIRCUIT WITH TRANSIENT RESPONSE CONTROL IN A MAGNETIC DISK UNIT

[75] Inventor: Takayoshi Yasui, Amagasaki, Japan

[73] Assignee: Mitsubishi Denki Kabushiki Kaisha, Tokyo, Japan

[21] Appl. No.: 209,666

[22] Filed: Jun. 21, 1988

[30] Foreign Application Priority Data

Oct. 9, 1987 [JP] Japan ................... 62-255374

[51] Int. Cl.$^5$ ............. G11B 5/02; G11B 5/09
[52] U.S. Cl. ............................. 360/67; 360/46
[58] Field of Search ............. 360/3, 46, 61, 65, 67

[56] References Cited

U.S. PATENT DOCUMENTS

| 4,392,164 | 7/1983 | Lequien | 360/67 |
| 4,517,612 | 5/1985 | Rijckaert et al. | 360/67 |
| 4,688,113 | 8/1987 | Parsons | 360/67 |
| 4,772,964 | 9/1988 | Kaida | 360/46 |
| 4,786,990 | 11/1988 | Overton et al. | 360/65 |

FOREIGN PATENT DOCUMENTS 61-99274  9/1986  Japan .

Primary Examiner—Vincent P. Canney
Attorney, Agent, or Firm—Townsend and Townsend

[57] ABSTRACT

A magnetic disk unit including a plurality of magnetic heads, in which for improving the deterioration of read margin due to the difference of output level of regenerative signals at every magnetic head and those at every block of a magnetic disk divided diametrically in plurality, at every magnetic head and every block their gain values are decided to reduce the difference of regenerative signal level between the magnetic heads and between the blocks, thereby an accurate and stable data propagation is made possible.

10 Claims, 3 Drawing Sheets

AGC CIRCUIT WITH TRANSIENT RESPONSE CONTROL IN A MAGNETIC DISK UNIT

BACKGROUND OF THE INVENTION

1. Field of the Invention

The present invention relates to a magnetic disk unit for storing data, more particularly, it relates to the magnetic disk unit which reduces the difference of level of respective regenerative signal read out from a plurality of magnetic heads.

2. Description of the Prior Art

FIG. 1 is a block diagram showing a gain control system of a conventional magnetic disk unit disclosed in Japanese Patent Laid-Open No. 61-199274(1986), in which numeral 1 denotes a magnetic recording medium and numeral 2 denotes a magnetic head which records and reproduces the data relative to the magnetic recording medium 1. Though the regenerative signal from each magnetic head 2 is inputted to an amplifying circuit 3 connected separately thereto, among these regenerative signals only the one outputted from the magnetic head 2 which is selected by a head selector circuit 4 is amplified at a constant gain in the amplifying circuit 3 and inputted to an automatic gain control amplifying circuit 5.

The automatic gain control amplifying circuit 5 is designed to increase or decrease the gain in response to the gain control signal which is an output from an AGC signal generating circuit 6 or from a fixed gain signal generating circuit 8 inputted selectively through a signal switching circuit 7 to amplify the signal inputted from the amplifying circuit 3 to be outputted. The signal switching circuit 7 is designed to be switched to the fixed gain signal generating circuit 8 while the magnetic head 2 is recording the data and to the AGC signal generating circuit 6 while reproducing the data.

The AGC signal generating circuit 6 is constituted to output the gain control signal in response to the regenerative signal level inputted from the automatic gain control amplifying circuit 5.

In addition, the fixed gain signal generating circuit 8 is designed to output the constant gain control signal regardless of the regenerative signal level.

In such conventional magnetic disk unit, among the regenerative signals from a plurality of magnetic heads 2 located adjacent to the magnetic recording medium 1, only the one from the magnetic head 2 selected by the head selector circuit 4 is, after being amplified to a constant level in the amplifying circuit 3, amplified in the automatic gain control amplifying circuit 5 in response to the gain control signal inputted from the signal switching circuit 7 as its gain being adjusted by increasing or decreasing, and inputted to the AGC signal generating circuit 6.

The signal switching circuit 7 inputs the gain control signal from the fixed gain signal generating circuit 8 to the automatic gain control amplifying circuit 5 and keeping a mu-factor at constant while the magnetic head 2 is recording the data, and at the early stage of inputting the regenerative signal to the AGC signal generating circuit 6, maintaining the gain of the automatic gain control amplifying circuit 5 below maximum, and simultaneously with the beginning of reproduction, switching to the signal from the AGC signal generating circuit 6 which generates the gain control signal in response to the regenerative signal level.

Now, in the conventional magnetic disk unit described hereinabove, when the magnetic head is in the recording state, the automatic gain control amplifying circuit 5 amplifies and controls in response to the gain control signal from the fixed gain signal generating circuit 8, so that the gain is maintained at a prescribed value, but for example, when the magnetic head 2 is switched over to the reproducing state without becoming the recording state or is moved diametrically on the magnetic disk as keeping the reproducing state, in the beginning, due to the difference of regenerative data level between the magnetic heads 2, the gain immediately after switching becomes too large or too small in response to the occasional reproducing data level, thus a voltage amplitude of the regenerative signal becomes unstable in the beginning of read operation results in an inaccurate data propagation.

SUMMARY OF THE INVENTION

The present invention is devised to solve the problems of the prior art mentioned hereinabove, therefore, a first object of the present invention is to provide a magnetic disk unit which is possible to obtain respective gain values of a plurality of magnetic heads to reduce the difference of regenerative signal level by each of the plurality of magnetic heads.

It is a second object of the present invention to provide a magnetic disk unit in which an accurate and stable data propagation is made possible by reducing said regenerative signal level.

The above and further objects and features of the present invention will more fully apparent from the following detailed description with accompanying drawings.

DESCRIPTION OF THE PREFERRED EMBODIMENTS

The present invention will be specifically explained in the following with reference to the drawings showing the embodiment.

Figure 1:
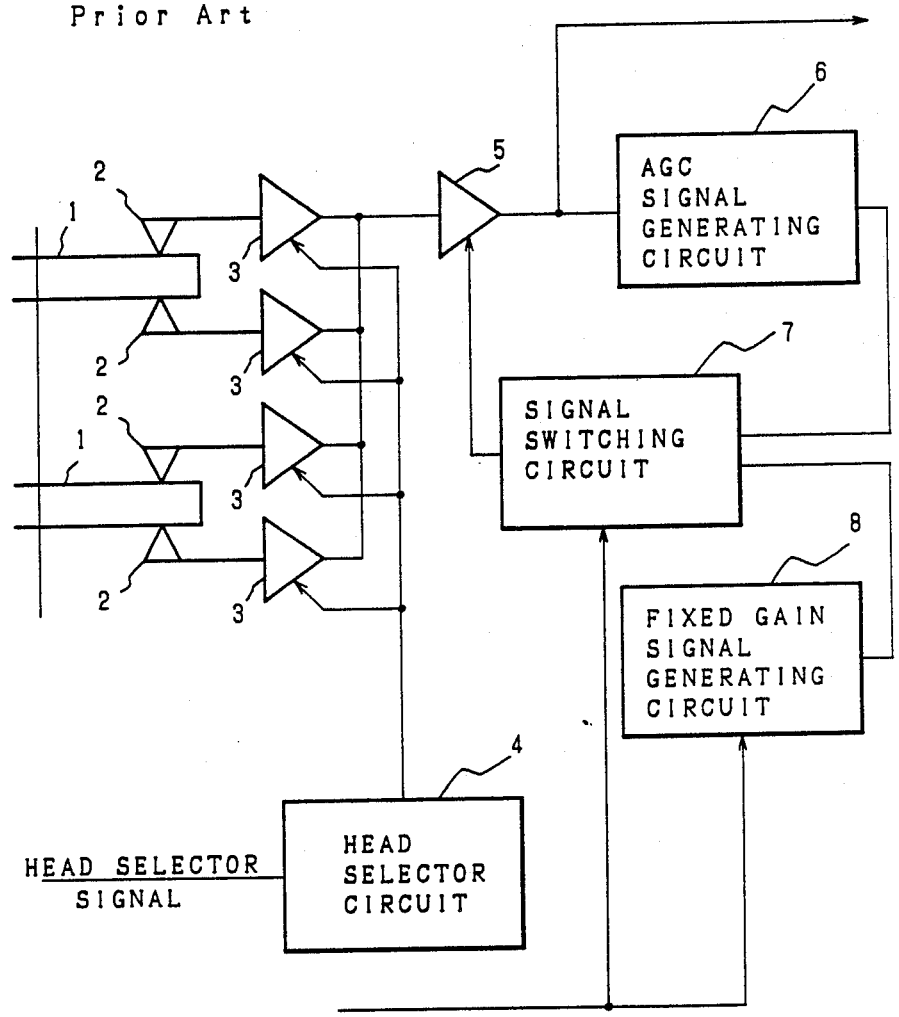
FIG. 1 is a block diagram showing a gain control system of a conventional magnetic disk unit.
Figure 2:
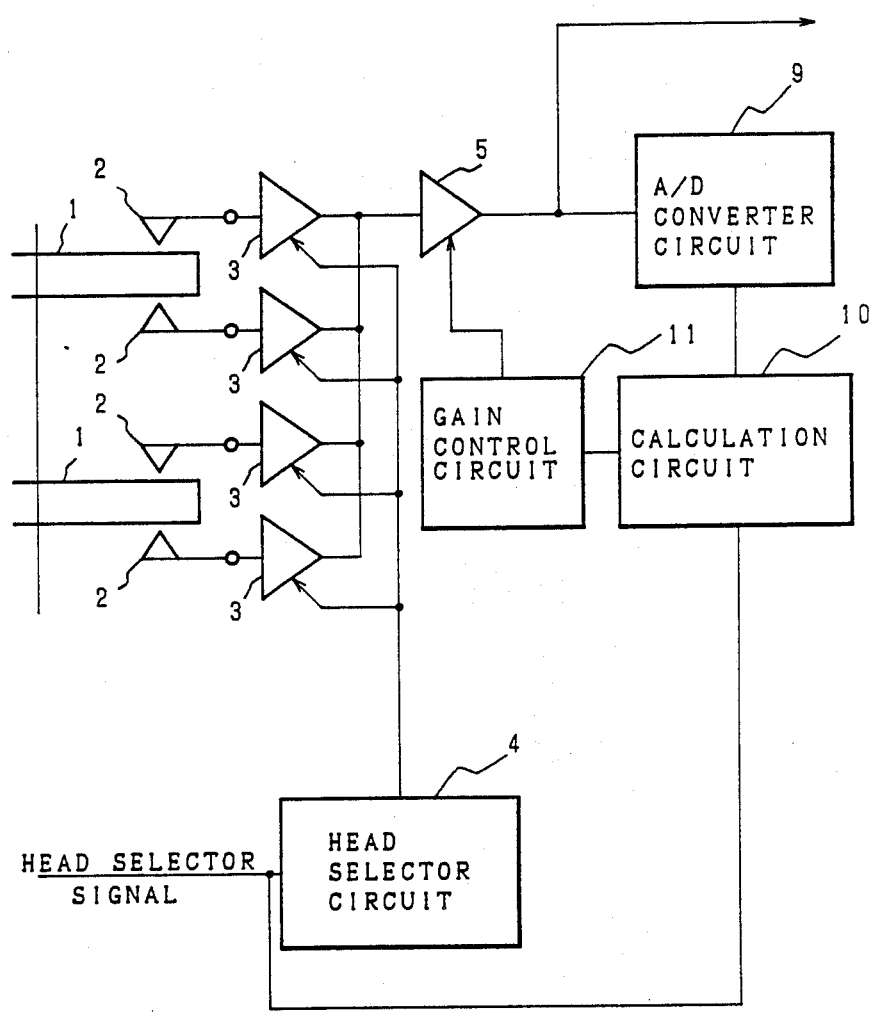
FIG. 2 is a block diagram showing a gain control system of a magnetic disk unit of the present invention.

FIG. 2 is a block diagram showing a gain control system of a magnetic disk unit (hereinafter referred to as the present unit) according to the present invention, in which numeral 1 indicates a magnetic recording medium which records data, and numeral 2 indicates a magnetic head which records the data in the magnetic recording medium 1 and reproduces the data therefrom.

On each magnetic recording medium 1, a plurality of magnetic heads 2 . . . are disposed adjacent to the recording faces thereof, among the regenerative signals from each magnetic head 2 only the one outputted from the magnetic head 2 which is selected by a signal from a magnetic head selector circuit 4 is inputted to a amplifying circuit 3, amplified at a constant gain and inputted to an automatic gain control amplifying circuit 5.

The automatic gain control amplifying circuit 5 increases or decreases the inputted gain of the regenerative signal in response to the gain control signal from a gain control circuit 11 to amplify it at a suitable gain, outputting it to a A/D (analog→digital) converter circuit 9. The A/D converter circuit 9 converts the analog signal outputted from the automatic gain control amplifying circuit 5 into the digital signal to output it to a calculation circuit 10 which is a gain operation means and gain holding signal generating means. The calculation circuit 10 calculates a gain value necessary to bring the inputted regenerative signal within the set range in response to the digital signal inputted and the set range inputted in advance, and outputs the gain value to a gain control circuit 11.

The gain control circuit 11 outputs the gain control signal responsive to the gain value inputted from the calculation circuit 10 to the automatic gain control amplifying circuit 5.

Figure 3:
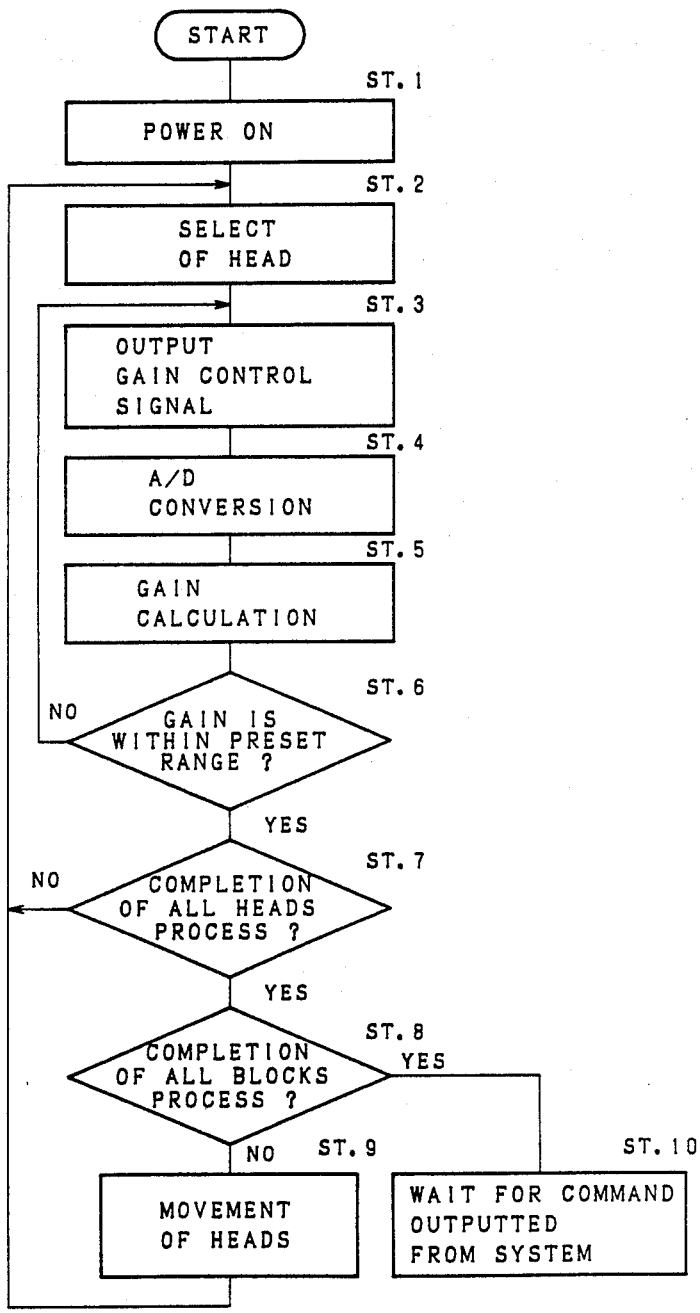
FIG. 3 is a flow chart showing a gain control process of a magnetic disk unit of the present invention.

The operation of the present unit will now be described with reference to a flow chart shown in FIG. 3.

When the power is switched on, (Step 1), though the regenerative signals are outputted from respective magnetic heads 2.2 ... only the one from the magnetic head 2 selected by the selector signal from the magnetic head selector circuit 4 is amplified at a prescribed gain in the amplifying circuit 3, (Step 2), inputted to the automatic gain control amplifying circuit 5 to be amplified in response to the gain control signal from the gain control circuit 11, (Step 3). The amplified regenerative signal is converted into the digital signal in the A/D converter circuit 9, (Step 4), and the gain value is calculated in response to the converted digital signal in the calculation circuit 10, (Step 5). Whether the gain value thus calculated is within a preset range or not is determined, (Step 6), when no, the gain value is calculated repeatedly to bring the difference to the value within the set range, and outputted from the gain control circuit 11 to repeat the aforementioned process.

When the calculated gain value is brought within the set range, it is determined whether or not the aforesaid process has been made for all magnetic heads 2, (Step 7), the selector signal is outputted from the magnetic head selector circuit 4 to the amplifying circuit 3 connected to the other magnetic head 2, and the process described hereinabove is repeated with respect to the regenerative signal by the magnetic head 2 to bring it within the set range.

When such process for all magnetic heads is completed, it is determined whether it has been completed for all blocks of magnetic recording medium 1, (Step 8).

That is since output levels of the regenerative data of the magnetic recording medium 1 differ by its diametrical location, the magnetic recording medium 1 is divided diametrically, for example, in 6 blocks to decide a mu-factor which is capable of eliminating the regenerative signal level difference of each magnetic head 2 for each block, (Step 9).

When this is completed a command has to be outputted from the system, (Step 10).

The gain value of each magnetic head in each block is stored in an internal memory, so, as far as the power of the magnetic disk is not cut, the calculation is not performed, thus it can be used usually without any problem.

As described heretofore, in the present unit, since it is designed to be amplified by deciding the mu-factor relative to the regenerative signal of the individual magnetic head so as to reduce the difference of regenerative signal level between each magnetic head, dispersion of the regenerative signal level is little even in the beginning of switching of the magnetic head during reproduction, thus the voltage amplitude is stabilized resulting in an accurate propagation of the regenerative signal and a high reliability.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A magnetic disk unit for reducing a difference in regeneration levels of amplified data signals read by a plurality of magnetic heads from a magnetic medium, comprising:

an automatic gain control amplifying circuit for amplifying, in response to a control signal, one of the data signals, said data signal having a first amplification level;

a gain calculation means, coupled to an output of said automatic gain control amplifying circuit, for dynamically calculating a gain value for said data signal in response to said first amplification level of said data signal received from said output of said automatic gain control amplifying circuit wherein said gain value specifies a second amplification level for said data signal which will bring said data signal within a prescribed range;

a gain holding signal generating means, coupled to said gain calculation means and responsive to said gain value, for generating a holding signal to hold said data signal at said second amplification level within said prescribed range; and a gain control means for outputting said control signal to said automatic gain control amplifying circuit, said gain control means responsive to said holding circuit to control said automatic gain control amplifying circuit to amplify said data signal to said second amplification level.

2. A magnetic disk unit as set forth in claim 1, further comprising:

a memory means, coupled to said gain calculation means, for storing said gain values for data signals read from each respective magnetic head so that data signal levels are all held within said prescribed range.

3. A magnetic disk unit as set forth in claim 2, wherein said stored amplification values of each magnetic head is calculated for every track of said magnetic recording medium.

4. An apparatus for reducing a difference between levels of respective regenerative signals to be controllably amplified from a first and a second magnetic head in operative relationship to a magnetic recording medium, wherein the regenerative signals are selected in response to an output from a head selector circuit responsive to a head selector signal, comprising:

an automatic gain control circuit having an input terminal for receipt of the selected regenerative signals, a control terminal for receipt of a control signal, and an output terminal for providing a controllably amplified regenerative signal having a first amplification level;

a gain calculation circuit coupled to said output terminal and responsive to the head selector signal and to said first amplification level of said controllably amplified regenerative signal to dynamically calculate and output a gain signal on a gain calculation circuit output terminal by use of a gain value dynamically calculated from said first amplification level for a specified magnetic head and a specified track position as determined by said heat selector signal wherein said gain signal is indicative of a second amplification level desired for said controllably amplified regenerative signal to provide said controllably amplified regenerative signal within a prescribed range;

a gain control circuit coupled to said output terminal of said calculation circuit and said automatic gain control circuit control terminal, said gain control circuit responsive to said gain signal to generate said control signal; and said automatic gain control circuit responsive to said control signal to controllably amplify said regenerative signal to provide said second amplification level for said regenerative signals within said prescribed range.

5. An apparatus for reducing a difference between levels of respective regeneration signals according to claim 4, further comprising:

memory means, responsive to the head selector signal, for storing said gain value for each of said specified magnetic heads and specified track positions; and means for supplying said gain value to said gain calculation circuit in response to said head selector signal.

6. An apparatus for reducing a difference between levels of respective regeneration signals according to claim 4, wherein said apparatus is operative during recording and reading operations.

7. An apparatus for calculating a plurality of gain values for respective plurality of magnetic head units at preselected track positions to permit the substantial equalization of regenerative signals read by bringing amplified levels within a prescribed range, comprising:

a head selector circuit responsive to a head selector signal specifying a particular magnetic head and track position to be accessed and producing a regenerative data signal to be controllably amplified;

an automatic gain control circuit having an input terminal for receipt of the selected regenerative data signal, and an output terminal for providing a controllably amplified regenerative signal having a first amplification level;

a gain calculation circuit coupled to said output terminal and responsive to said first amplification level of said controllably amplified regenerative signal to dynamically calculate a gain value for establishing a gain signal indicative of a second amplification level desired for said controllably amplified regenerative data signal to bring said second amplification level within a prescribed range; and memory means, responsive to the head selector signal, for storing said calculated gain value for each magnetic head at each preselected track position as determined by said head selector signal.

8. A method for reducing differences between respective amplification levels of respective regeneration signals read from a first and a second magnetic head in operative relationship to a magnetic recording medium wherein the regenerative signals are selected in response to an output from a head selector circuit responsive to a head selector signal, comprising the steps of:

providing an automatic gain control circuit having an input terminal for receipt of the selected regenerative data signal, a control terminal for receipt of a control signal, and an output terminal for providing a controllably amplified regenerative signal having a first amplification level;

dynamically calculating, in response to said amplification level of said controllably amplified regenerative signal, a gain value from said first amplification level for specified magnetic head and specified track position as determined by said head selector signal;

outputting a gain signal responsive to said gain value to indicate a second amplification level desired for said controllably amplified regenerative signal to bring said amplified regenerative signal within a prescribed range; and generating a control signal in response to said gain signal and supplying said control signal to said automatic gain control circuit to controllably amplify said regenerative signal to provide said second amplification level for said regenerative signal within said prescribed range.

9. A method as recited in claim 8, further comprising the steps of:

prestoring, in response to a first dynamic calculation of said gain values in response to said head selector signal, said gain values for each magnetic head for preselected positions of said selected magnetic head.

10. An apparatus for controlling inaccurate data propagation due to a transient transition of amplification levels for a plurality of magnetic heads reading regenerative data signals which occurs after a transition period which includes a termination of a recording operation and a start of a reading operation, and during movement of magnetic heads and alternation of selected magnetic heads, comprising:

an automatic gain control circuit having an input terminal for receipt of the selected regenerative signal, a control terminal for receipt of a control signal and an output terminal for providing a controllably amplified regenerative signal having a first amplification level during the transition period;

a gain calculation circuit coupled to said output terminal and responsive to the head selector signal and to said amplification level of said controllably amplified regenerative signal to periodically calculate and output a gain signal on a calculation circuit output by use of a gain value dynamically calculated from said first amplification level for a specified magnetic head and a specified track position as determined by said selector signal wherein said gain signal is indicative of a second amplification level desired for said controllably amplified regenerative signal to bring said second level within a prescribed range;

a gain control circuit coupled to said output terminal of said calculation circuit and said control terminal, said gain control circuit responsive to said gain signal to periodically generate said control signals during said transition period; and said automatic gain control circuit responsive to said control signal to controllably amplify said regenerative signal to provide said second amplification level for said regenerative signal to maintain said second level within sid prescribed range during said transition period.

* * * * *